(12) United States Patent
Giginiak et al.

(10) Patent No.: US 10,339,125 B2
(45) Date of Patent: Jul. 2, 2019

(54) INDEXING USER-DEFINED MINUTIAE

(71) Applicant: Facebook, Inc., Menlo Park, CA (US)

(72) Inventors: Volodymyr Giginiak, London (GB);
Timothee Lacroix, Paris (FR)

(73) Assignee: Facebook, Inc., Menlo Park, CA (US)

( * ) Notice: Subject to any disclaimer, the term of this patent is extended or adjusted under 35 U.S.C. 154(b) by 968 days.

(21) Appl. No.: 14/449,622

(22) Filed: Aug. 1, 2014

(65) Prior Publication Data
US 2016/0034511 A1  Feb. 4, 2016

(51) Int. Cl.
*G06F 16/22* (2019.01)
*H04L 12/18* (2006.01)
*G06F 16/951* (2019.01)
*G06F 16/332* (2019.01)
*H04L 12/58* (2006.01)
*G06Q 50/00* (2012.01)

(52) U.S. Cl.
CPC ...... *G06F 16/2272* (2019.01); *G06F 16/3322* (2019.01); *G06F 16/951* (2019.01); *H04L 12/1831* (2013.01); *H04L 51/32* (2013.01); *G06Q 50/01* (2013.01); *H04L 51/043* (2013.01)

(58) Field of Classification Search
None
See application file for complete search history.

(56) References Cited

U.S. PATENT DOCUMENTS

2007/0050352 A1* 3/2007 Kim .................... G06F 17/2223
2014/0330818 A1* 11/2014 Raina ................... G06Q 30/02
  707/723

* cited by examiner

Primary Examiner — Amresh Singh
(74) Attorney, Agent, or Firm — Baker Botts L.L.P.

(57) ABSTRACT

In one embodiment, a computing device receives text input from a user. The computing device determines an action by the user indicated in the text, and at least a part of a phrase in the text that indicates one or more topics associated with the action. The computing device determines whether the at least part of a phrase matches one or more phrases stored in an indexed database. When the at least part of a phrase does not match one or more phrases of the indexed database, then the computing device determines a complete phrase input by the user, and determines one or more topics to be associated with the complete phrase. The computing device stores the complete phrase as an instance of the complete phrase. The computing device determines whether at least a threshold number of instances of the complete phrase has been stored.

19 Claims, 9 Drawing Sheets

INDEXING USER-DEFINED MINUTIAE

TECHNICAL FIELD

This disclosure generally relates to suggesting content for a user to share on an online-social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may use a set of minutiae phrases to define real-world actions of users of the social-networking system. For example, minutiae phrases may be defined for particular books, movies, games, music that a user is reading, watching, playing, or listening to; other minutiae phrases may define a state of the user, such as happy, hungry, driving, etc. In particular embodiments, the social-networking system may adjust the set of minutiae phrases based on user-defined phrases input by users of the social-networking system. The set of minutiae phrases may be stored in an indexed database, where each minutiae phrase is indexed by one or more topics or one or more categories determined to be associated with the particular minutiae phrase.

In particular embodiments, the social-networking system may suggest one or more minutiae phrases to a user typing in a post to be shared on the social-networking system, such as a status update. The user may ignore the suggested minutiae phrase and input their own phrase into the status update. The social-networking system may associate topics and categories to be associated with the user-defined phrase, based on the context of the phrase such as one or more actions indicated by the status update. The social-networking system may track the number of instances that a particular phrase has been shared by users of the social-networking system using a time-decayed aggregate count. If a particular phrase has an aggregate count exceeding a threshold, the social-networking system may add the particular phrase to the indexed database.

In particular embodiments, the social-networking system may calculate a probability distribution for a particular word, wherein the probability distribution represents the probability that if the word is used in a status update by a user, the word will be associated with a particular category. The social-networking system may use the probability distribution to tag topics and categories to new phrases being input by a user, or to suggest one or more minutiae phrases to a user.

DESCRIPTION OF EXAMPLE EMBODIMENTS

Figure 1:
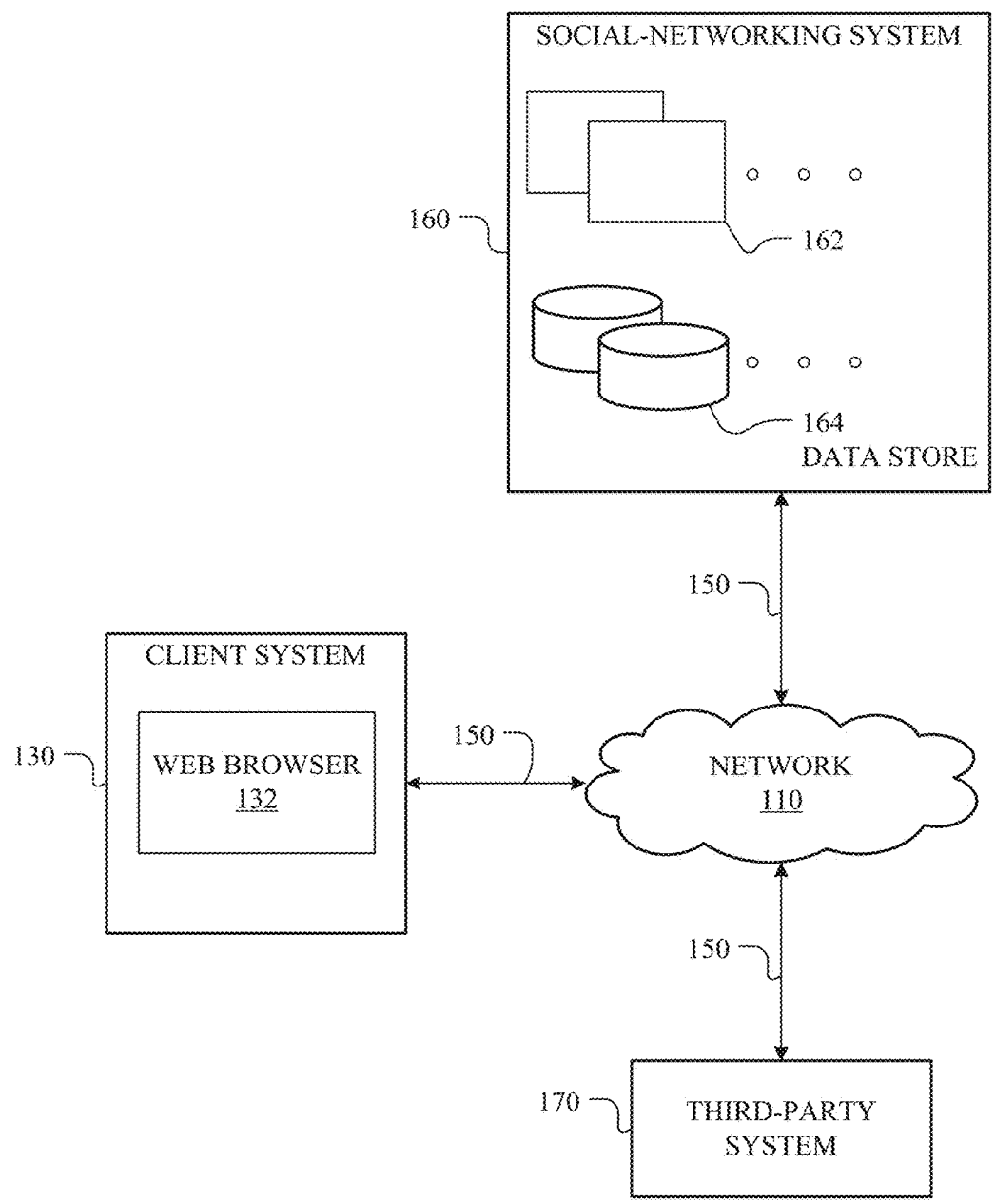
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
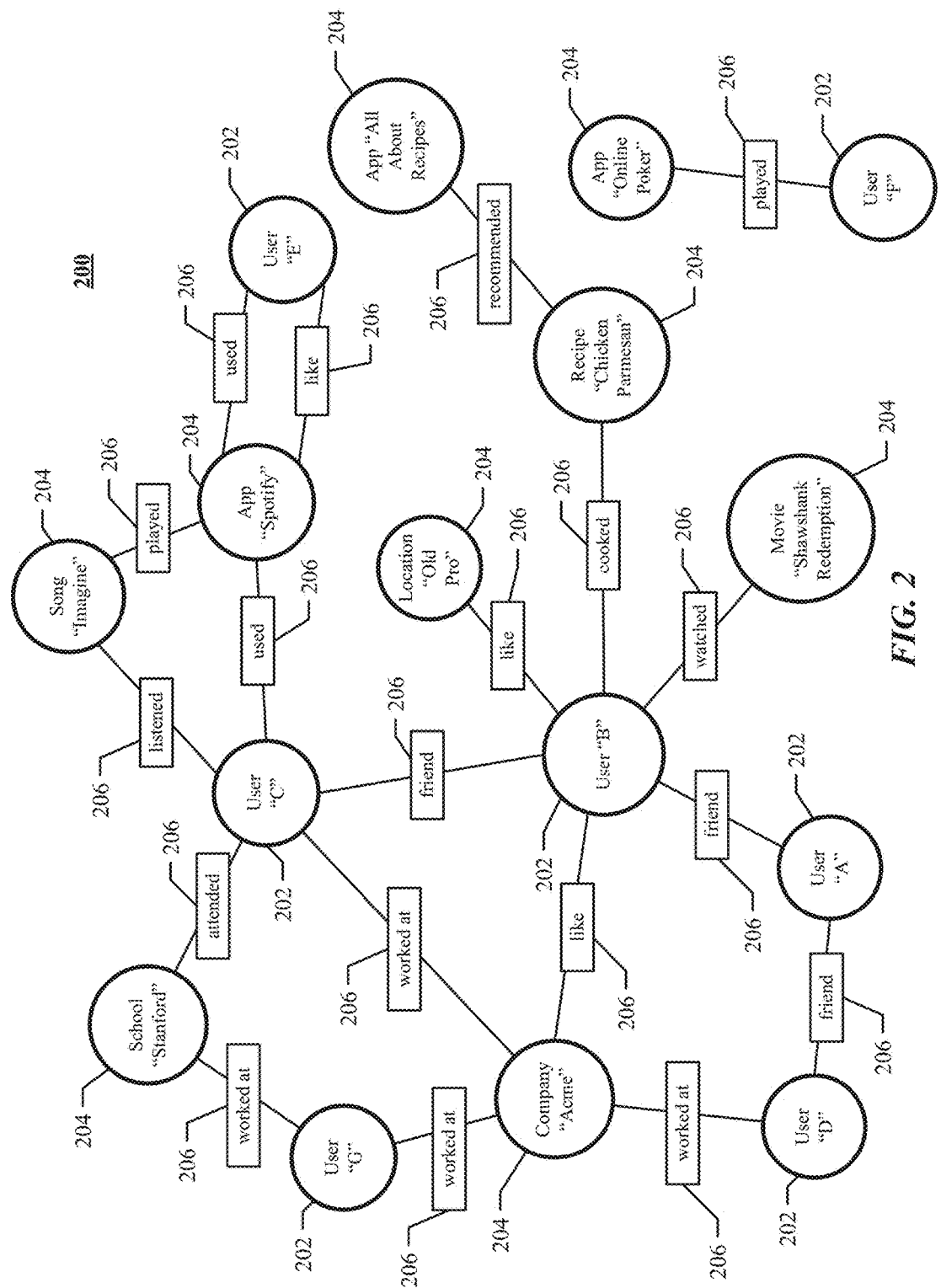
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, a user of social-networking system 160 may share content with one or more other users, where the content relates to a current status or activity of the user. As an example and not by way of limitation, the user may share on social-networking system 160 a status update relating to a television show or movie that the user is watching; a book that the user is reading; a food item that the user is eating; or any other activity that the user may be engaged in. The user may input text in a user interface provided by social-networking system 160 to share a status update, which is then sent by social-networking system 160 to other users of social-networking system 160 who are authorized to access status updates of the user.

In particular embodiments, social-networking system 160 may determine one or more minutiae or minutiae phrases to be associated with a status update shared by a user. In particular embodiments, a minutiae phrase may indicate a particular feeling of a user, or a particular activity of a user. In particular embodiments, the minutiae phrase may be defined for the specific object of the particular activity of the user. As an example and not by way of limitation, if the user posts a status update to social-networking system 160 that she is "reading Mockingjay," social-networking system 160 may determine that the status update is related to a minutiae phrase for the book "Mockingjay." As another example and not by way of limitation, a user may share a status update stating that he is "hungry." Social-networking system 160 may determine that this status update contains one minutiae phrase for the feeling of hunger. In particular embodiments, the minutiae phrase may be defined for the object of the particular activity of the user in addition to the activity. As an example and not by way of limitation, a user may share a status update stating that he is "playing Titanfall and eating pizza." Social-networking system 160 may determine that this status update contains two minutiae phrases; one for "playing" the video game "Titanfall" and another for "eating" the food item "pizza."

In particular embodiments, social-networking system 160 may associate a particular minutiae with a single action described by the user. As an example and not by way of limitation, in the example above, social-networking system 160 may assign one minutiae for the action described as "playing Titanfall," and a second minutiae for the action described as "eating pizza." In particular embodiments, social-networking system 160 may assign one minutiae for multiple activities of a single user. As an example and not by way of limitation, if social-networking system 160 determines that the phrase "watching baseball and eating hot dogs" is submitted to social-networking system 160 frequently enough that social-networking system 160 may determine the two activities are related, social-networking system 160 may use a single minutiae to cover both activities of a user.

Figure 3:
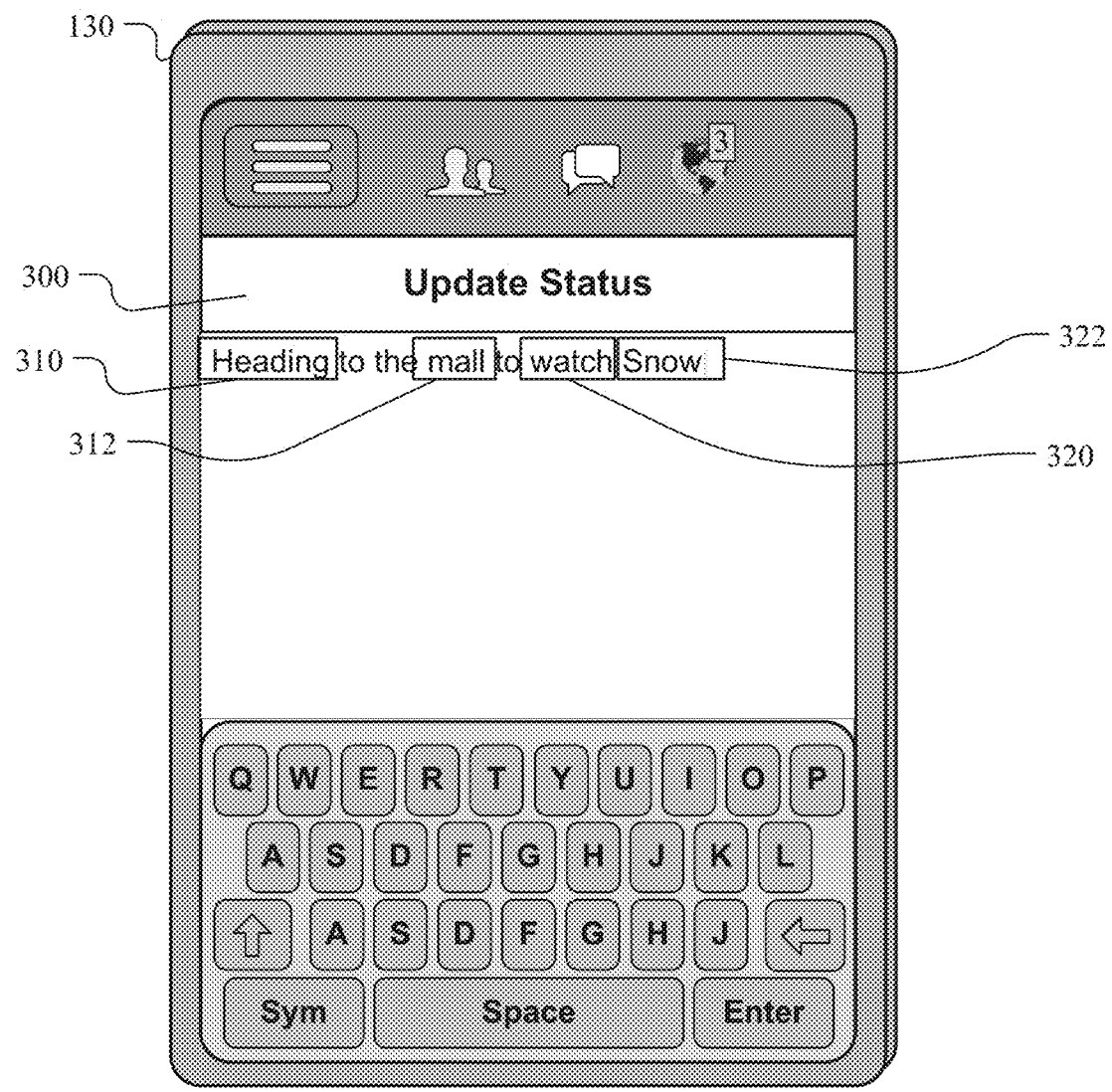
FIG. 3 illustrates an example status update of a user of the social-networking system.

FIG. 3 illustrates an example embodiment of a status update shared by a user of social-networking system 160. A user may access an interface 300 for sharing a status update. The user may input text into interface 300 describing a current status of the user. The text may contain words or phrases indicating an action of the user. As an example and not by way of limitation, social-networking system 160 may determine that the user has input active verbs indicating one or more actions of the user, such as text 310 and text 320 which respectively indicate that the user is "heading" to a location and "watching" something. In particular embodiments, social-networking system 160 may determine other sections of the input text which correspond to the one or more actions determined by social-networking system 160 to be described in the status update. In the example of FIG. 3, social-networking system 160 may determine that text 312 is associated with the action text 310, and text 322 is associated with the action text 320. In particular embodiments, social-networking system 160 may determine separate minutiae for each of the actions determined to be described in the status update. In particular embodiments, social-networking system 160 may determine that a plurality of actions and related text may be described by a single minutiae.

In particular embodiments, social-networking system 160 may determine one or minutiae based on existing pages of social-networking system 160. As an example and not by way of limitation, if the user has posted a status update stating "playing Titanfall," social-networking system 160 may then determine that there are one or more pages on social-networking system 160 relating to a video game "Titanfall," and determine that the user intended to mean that particular video game. In particular embodiments, the pages associated with the input text may also be associated with one or more topics, or one or more categories. As an example and not by way of limitation, the page for "Titanfall" may be associated with a topic for the video game "Titanfall," as well as categories for "first-person shooter" and "XBox One video game." The topics and categories associated with a particular minutiae may be used to determine a context for users when they input the particular phrase matching the minutiae, as will be discussed below.

In particular embodiments, social-networking system 160 may maintain an indexed database of minutiae phrases which correspond to all the minutiae determined by social-networking system 160. As an example and not by way of limitation, social-networking system 160 may determine one or more minutiae for each page of social-networking system 160, and add the one or more minutiae to an indexed database. The database may index the minutiae by their associated topics or associated categories.

In particular embodiments, social-networking system 160 may determine one or more minutiae phrases that have been used by a particular user of social-networking system 160. As an example and not by way of limitation, a user may input the following status updates throughout a single day: "pancakes for breakfast"; "reading A Dance With Dragons"; "bought a new pair of Vans"; "feeling hungry!"; and "eating pizza for dinner and watching Mean Girls." Social-networking system 160 may determine that the particular user may be associated with minutiae phrases relating to the food "pancakes"; the book titled "A Dance With Dragons"; the Vans brand of shoes; the feeling of "hunger"; the food "pizza"; and the movie "Mean Girls". In particular embodiments, social-networking system 160 may use the minutiae phrases associated with a particular user to suggest other content or users relating to those minutiae phrases, or to promote a particular status update to other users. As an example and not by way of limitation, social-networking system 160 may determine that a friend of the particular user also watched the movie Mean Girls recently. Social-networking system 160 may promote the status update regarding Mean Girls to the friend to improve the chances that the friend will be notified that the particular user is also watching the same movie. As another example and not by way of limitation, at the same time that the particular user has indicated that she is hungry, a second friend of the particular user may have posted a status update saying that he is "starving." Social-networking system 160 may determine that the two status updates have substantially identical minutiae, and inform the particular user that the second friend is also hungry. In particular embodiments, social-networking system 160 may send a notification to the particular user or to the second friend. In particular embodiments, social-networking system 160 may provide an interface of groups of users which the particular user may view, and a particular group of users may be defined as "Friends Who Are Hungry Near You," wherein the second friend would be included in the particular group of users. Further description of using minutiae as a basis for notifying other users with similar interests may be found in U.S. patent application Ser. No. 14/231,049, filed 31 Mar. 2014, which is incorporated by reference.

In particular embodiments, social-networking system 160 may monitor the text input by a user, determine that the user is entering text that may be described by a minutiae, and determine before the user has finished inputting the text whether the string of text already input by the user can be correlated to one or more particular minutiae phrases stored in an indexed database of social-networking system 160. As an example and not by way of limitation, if the video game "Titanfall" has been added as a minutiae phrase to social-networking system 160, and a user subsequently starts to input a status update stating "going home to play Tita . . . ," social-networking system 160 may determine that the user has input an action word "play," determine that the subsequent string of text "Tita" is related to the action word "play," and determine whether the indexed database contains a minutiae phrase that corresponds to both the input text and the action word. In this example, social-networking system 160 may determine that "Titanfall" corresponds to the current input of the user. In particular embodiments, social-networking system 160 may provide an autosuggestion or typeahead functionality, so that instead of finishing manually inputting the word "Titanfall" into the status update, social-networking system 160 may provide an interactive element displaying the word "Titanfall," and the user may opt to choose the interactive element to finish inputting the word.

In particular embodiments, a user of social-networking system 160 may ignore a typeahead suggestion provided by social-networking system 160 for a minutiae phrase, and input their own phrase. Alternatively, social-networking system 160 may not be able to determine a corresponding minutiae phrase for the text input by the user. In both of the above cases, social-networking system 160 may determine that the text input by the user may correspond to a new minutiae phrase which is currently not stored by social-networking system 160. As an example and not by way of limitation, in the above example where social-networking system 160 has suggested "Titanfall" to the user, the user may choose to reject that suggestion and finish typing the status update stating "going home to play Titan Quest." Social-networking system 160 may determine that there is no page on social-networking system 160 corresponding to a game called "Titan Quest," nor is there an existing minutiae phrase in social-networking system 160 corresponding to the phrase "Titan Quest." Social-networking system 160 may then determine whether a minutiae phrase corresponding to "Titan Quest" should be created, indexed by topic or category, and added to the indexed database of social-networking system 160.

As another example and not by way of limitation, social-networking system 160 may determine that a minutiae phrase corresponding to a phrase input by the user does not match the context of the status update. For example, a user may input a status update stating, "Eating ratatouil . . . " Social-networking system 160 may determine that the phrase "ratatouil" may correspond to the movie titled "Ratatouille"; however, social-networking system 160 may determine that a movie-related minutiae phrase does not fit the action of the status update, which was "eating." If there is no minutiae in the indexed database of social-networking system 160 for the food called ratatouille, social-networking system 160 may determine that any existing minutiae phrase is nonsensical in the meaning of the status update, and determine that there is no appropriate minutiae phrase to suggest.

In particular embodiments, social-networking system 160 may compare a phrase against another phrase indicating an action. As an example and not by way of limitation, a user may input a status update stating "Lunch today is ratatou . . . " In this example, although there is no verb such as "eating" to indicate to social-networking system 160 that the movie "Ratatouille" may be inappropriate to suggest as minutiae, social-networking system 160 may compare the text "ratatou . . . " with the nearby phrase "Lunch today is . . . " and determine that the text "ratatou" should be related to the user's lunch, and that a movie-related minutiae is inappropriate.

In particular embodiments, a user may indicate an action that the user is currently engaged in without inputting text directly relating to the particular action. As an example and not by way of limitation, social-networking system 160 may provide an interface to the user wherein the user may interact with an element on the interface such as "what are you watching?", then input text such as "Silicon Valley." Social-networking system 160 may determine based on the user's selection of the "what are you watching?" element that the user text input of "Silicon Valley" refers to the TV show of the same name, and determine that the minutiae phrase corresponding to the TV show "Silicon Valley" is being used.

Figure 4:
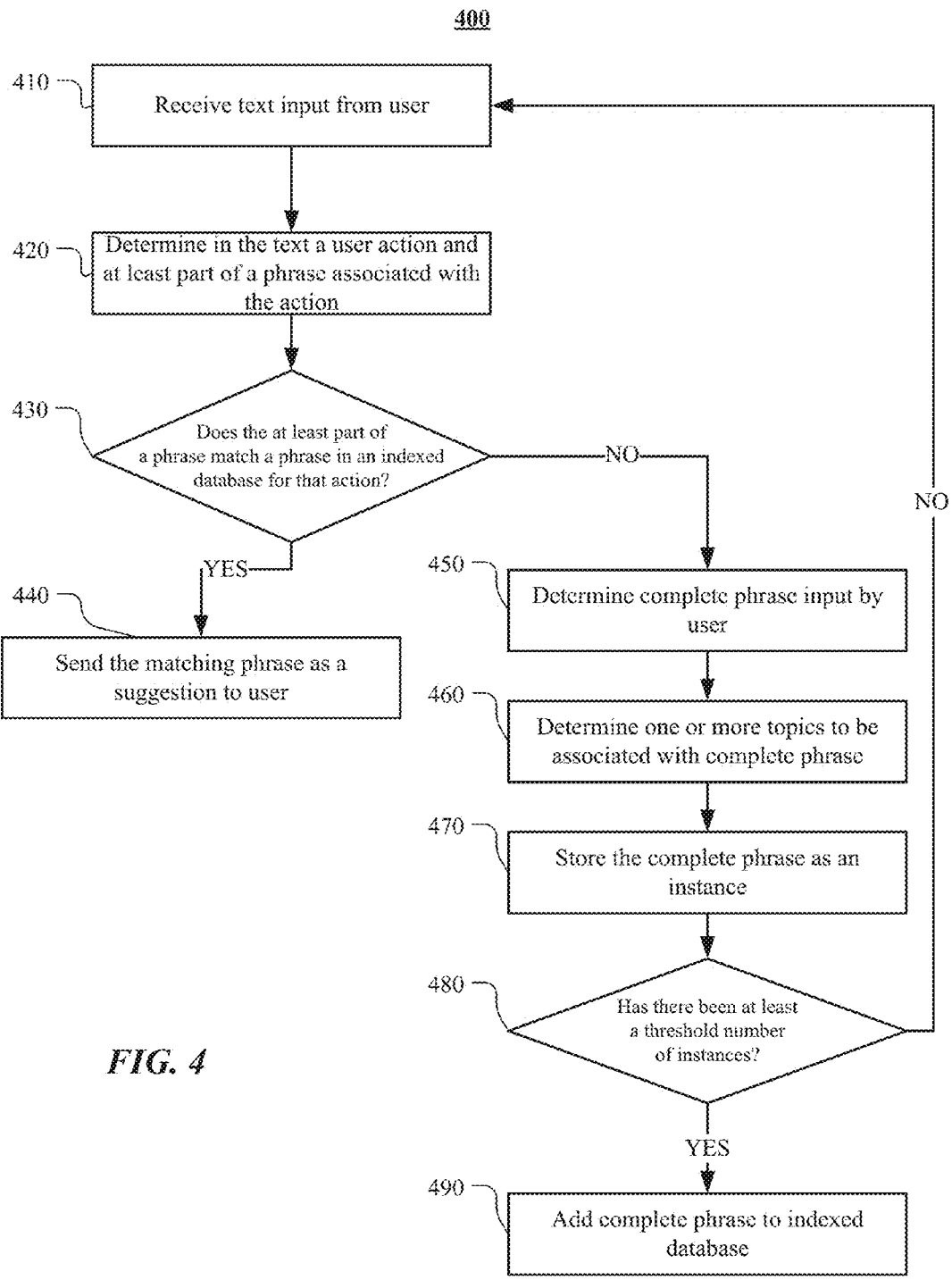
FIG. 4 illustrates an example method for adding user-defined minutiae to an index.

FIG. 4 illustrates an example method 400 for adding user-defined phrases to an indexed database of social-networking system 160. The method may begin at step 410, where social-networking system 160 may receive text input from a user. As an example and not by way of limitation, the text input may be a status update of the user. At step 420, social-networking system 160 may determine within the text input by the user a user action and at least part of a phrase that may be associated with the action. As an example and not by way of limitation, social-networking system 160 may determine that the user has input at least one verb indicating an action of the user, such as "playing," and determine a part of the text that corresponds to the object of that verb, such as "darts." At step 430, social-networking system 160 may determine whether the at least part of a phrase may be match to a phrase in an indexed database of social-networking system 160. As an example and not by way of limitation, social-networking system 160 may determine if there is an existing minutiae phrase for "darts" which corresponds to the action "playing." If there is a matching phrase, then at step 440, social-networking system 160 may suggest the matching phrase to the user. As an example and not by way of limitation, the matching phrase may be sent to the user as a typeahead suggestion or an autosuggestion.

If there is no matching phrase within the indexed database, then at step 450, social-networking system 160 may determine whether the user has completed the text input, and what the complete phrase associated with the action is. As an example and not by way of limitation, social-networking system 160 may determine that when the user submits the status update to share on social-networking system 160, the user has finished the text input, and a complete phrase can be determined rather than the at least part of a phrase used in step 420. In the example above, the user may complete the text input by typing in "playing dartsmouth." At step 460, social-networking system 160 may determine one or more topics to be associated with the complete phrase. Various methods of associating topics to the phrase, including based at least in part on the user action associated with the complete phrase, are discussed in detail below. In particular embodiments, social-networking system 160 may also associate one or more categories to the complete phrase. At step 470, social-networking system 160 may store the complete phrase as a particular instance of that complete phrase being used on social-networking system 160.

At step 480, social-networking system 160 may determine if the particular phrase has been stored by social-networking system 160 at least a threshold number of times. As an example and not by way of limitation, social-networking system 160 may determine whether the particular complete phrase having the same indexed topics and categories has been shared by a user of social-networking system 160 at least ten times. The ten times may be one user sharing the particular complete phrase ten times, or ten users each sharing the complete phrase one time. In particular embodiments, the number of instances may be discounted over time, such that an older instance of the complete phrase being used is considered less than one instance. As an example and not by way of limitation, if the threshold number of instances is ten uses of the complete phrase, and the complete phrase was shared by users of social-networking system 160 five times today and five times last month, the threshold number is not exceeded if social-networking system 160 decays the instances of the complete phrase from last month, and only considers those five times to only be worth three instances. At step 490, if the threshold number of instances is met, then social-networking system 160 will add the complete phrase with the associated topics and categories to the indexed database of social-networking system 160.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Social-networking system 160 may tag one or more topics to a complete phrase input by a user which does not correspond to any existing minutiae of social-networking system 160. Social-networking system 160 may implement any suitable means of determining topics and categories to use in tagging a particular complete phrase. As an example and not by way of limitation, social-networking system 160 may use information relating to Wikipedia relations or links between pages to estimate topics for a given word or phrase. This method may allow for the selection of topics that correlate between themselves, or cross-reference each other. As an example, if a user inputs the phrase "eating bulgogi. Love Korean food!" social-networking system 160 may be able to correlate relationships between the words "Korean food", and "bulgogi" based on relations determined between those words in Wikipedia and determine one or more topics for this complete phrase.

In particular embodiments, social-networking system 160 may determine a co-occurrence of entities in Wikipedia and calculate joint probabilities that two entities will appear in the same article. As an example and not by way of limitation, for a given phrase, social-networking system 160 may perform an entity extraction to determine a minutiae phrase. For an ambiguous entity, social-networking system 160 may select entities that maximize the joint probability for all selected entities. As another example and not by way of limitation, for the phrase "sweet apple", social-networking system 160 may determine two possible entities for "apple": the fruit apple, and the company Apple, Inc. Because "sweet" and the fruit "apple" has a higher probability of co-occurrence than "sweet" and the company "Apple", social-networking system 160 may select the fruit in this example.

In particular embodiments, social-networking system 160 may additionally check topics tagged to a particular phrase to ensure that the topics are consistent with the text input by the user. As an example and not by way of limitation, user Anna may share a status update to social-networking system 160 stating "Watching Bob's Burgers." Social-networking system 160 may determine that the phrase "Bob's Burgers" could refer to the topic of hamburgers, or a topic associated with a TV show titled "Bob's Burgers." Social-networking system 160 may compare the two topics with the action in this status update, i.e. "watching." Social-networking system 160 may determine that watching hamburgers makes less sense contextually than watching a TV show. Social-networking system 160 may then determine that the phrase "Bob's Burgers" should be tagged with the topic for the show, rather than food.

In particular embodiments, social-networking system 160 may use other tagged words or phrases in the text that do not directly reference an action, but may distinguish between possible topics. As an example and not by way of limitation, in the example status update above, user Anna may have tagged the word "Bob" in the phrase "Watching Bob's Burgers" as another user, e.g. Anna's friend Bob. Social-networking system 160 may then determine that since the word Bob is tagged with a user, the phrase "Bob's Burgers" does not reference the TV show, and more likely references the food. As another example, a user may post a status update stating "I think Bob's Burgers is an underrated show." While the action "think" in this status update may not help distinguish between food or the TV show, social-networking system 160 may base a determination on the word "show" at the end of the phrase and determine that the user meant to reference the TV show, not the food. Therefore, social-networking system 160 may tag this phrase with topics relating to the TV show.

In particular embodiments, a phrase may contain multiple actions or verbs, as well as multiple objects. Social-networking system 160 may determine which objects should correspond to which action. In particular embodiments, social-networking system 160 may look at the verb immediately preceding an object phrase, and determine that the object corresponds to the immediately precedent verb. In particular embodiments, social-networking system 160 may determine only one topic suitable for a particular phrase, correlate that phrase to the most appropriate action, then determine whether with the select action removed from consideration, whether any remaining phrases also only correspond to a single action. As an example and not by way of limitation, a user may post a status update stating "Eating ratatouille and watching Full House." In this example, because the phrase contains both "eating" and "watching", social-networking system 160 may not be able to determine whether the phrase "ratatouille" should be tagged with the food topic or the movie topic associated with the phrase. Social-networking system 160 may then first consider the other phrase, "Full House," determine that it only corresponds to "watching" and not "eating," and associate the phrase "Full House" with the topic for the TV Show Full House, and the action "watching." Social-networking system 160 may then determine that the action "Eating" still lacks a corresponding object, and determine that the phrase "ratatouille" should be tagged as food.

In particular embodiments, social-networking system 160 may perform an aggregate count of how many times a particular user-defined phrase has been received and tagged by social-networking system 160. The aggregate count may be based on the number of times social-networking system 160 has ever received the particular phrase from users of social-networking system 160, regardless of source. As an example and not by way of limitation, social-networking system 160 may receive the same phrase from a single user ten separate times, or may receive the same phrase from five users two times each, or the same phrase from ten users once each. In each of these cases, the aggregate count may be ten. In particular embodiments, social-networking system 160 may only base the aggregate count on the number of users sending the particular phrase. In the example above, the aggregate count in the first case is one, the count in the second case is five, and the count in the third case is ten. This embodiment may account for a single user or small group of users over-using a particular phrase.

In particular embodiments, each instance of use of a particular phrase may be decayed over time for the purposes of determining an aggregate count. This may reflect the idea that a particular phrase used sporadically over a long period of time is not as popular as a particular phrase that has a high rate of use in a short period of time. As an example and not by way of limitation, social-networking system 160 may assign each instance of the particular phrase shared to the social-networking system 160 a value of $f(t)$, where t is the elapsed time between the current time and the time that the particular instance of the particular phrase was shared. Social-networking system 160 may use any suitable function $f(t)$ such that the value decreases as t increases. As an additional example, $f(t)$ may simply be $1/t$, or $N-t$ where N is any appropriate constant.

In particular embodiments, social-networking system 160 may require that the aggregate count for a particular phrase exceed a threshold count before determining that the particular phrase should be added to an indexed database of social-networking system 160. In particular embodiments, social-networking system 160 may update the aggregate count for a particular phrase in response to receiving an instance of the particular phrase from a user. In particular embodiments, social-networking system 160 may update the previous aggregate count based on the time elapsed for each instance comprising the aggregate count, for embodiments where each instance is adjusted by a time decay factor. In particular embodiments, social-networking system 160 may determine that once a particular phrase has been added to the indexed database, it cannot be removed. In particular embodiments, social-networking system 160 may monitor the aggregate count for the particular phrase after it is added to the indexed database. If the aggregate count falls below a threshold count (e.g. due to the time decay factor and no additional uses of the particular phrase), then social-networking system 160 may remove the particular phrase from the indexed database. This may allow social-networking system 160 to filter out rarely-used phrases from the indexed database.

In particular embodiments, social-networking system 160 may additionally use a language filter to complete phrases before adding the complete phrase to the indexed database. As an example and not by way of limitation, social-networking system 160 may determine that a complete phrase contains an obscenity or other objectionable content, and thus it would not be desirable to suggest such a phrase to users of social-networking system 160. In particular embodiments, social-networking system 160 may simply remove the offensive parts of the phrase from the minutiae phrase, and store the non-offensive part of the phrase as a minutiae phrase in the indexed database. In particular embodiments, social-networking system 160 may delete the entire complete phrase from the indexed database.

In particular embodiments, if social-networking system 160 determines that a particular phrase has exceeded the threshold aggregate count for inclusion in the indexed database, social-networking system 160 may index the particular phrase by its associated topics and categories, and add the particular phrase to the indexed database of minutiae phrases. This may allow typeahead suggestions or autosuggestions to be made for subsequent text input corresponding to the particular phrase. In particular embodiments, social-networking system 160 may add the particular phrase to the indexed database based on the aggregate count of the particular phrase prior to determining one or more topics to be associated with the particular phrase. In particular embodiments, social-networking system 160 may first determine one or more topics to be associated with a particular phrase, and then add the particular phrase to the indexed database.

In particular embodiments, social-networking system 160 may determine that two or more minutiae phrases are substantively identical. Social-networking system 160 may then select one or more of the minutiae phrases and delete them from the indexed database, such that only one minutiae phrase is used for the subject of the minutiae phrase. As an example and not by way of limitation, social-networking system 160 may have in the indexed database a minutiae phrase for the text "2014 Miss Universe" with the appropriate topics and categories. Several users may share status updates referencing "Miss Universe 2014" instead, and social-networking system 160 may tag the phrase "Miss Universe 2014" with the same topics and categories as for "2014 Miss Universe." If the aggregate count for "Miss Universe 2014" exceeds the threshold count, social-networking system 160 may add the phrase as a minutiae phrase to the indexed database. Social-networking system 160 may subsequently determine that the phrase "Miss Universe 2014" is substantively identical to the phrase "2014 Miss Universe." In particular embodiments, the similarity between the two phrases may be indicated by a user or another person to social-networking system 160. In particular embodiments, social-networking system 160 may automatically detect the similarity based on a comparison of the text as well as the associated topics and categories.

In particular embodiments, social-networking system 160 may select one or more phrases for deletion based on a comparison of the time each phrase was added to the indexed database. As an example and not by way of limitation, social-networking system 160 may keep the older phrase, and delete the newer phrase from the indexed database. In particular embodiments, social-networking system 160 may keep the newer phrase and delete the older phrase, ensuring that the newly popular phrase is kept in the indexed database. In particular embodiments, if some period of time has passed between the time the duplicative minutiae phrases were added to the indexed database and the time the duplicity was detected, social-networking system 160 may determine keeping one or more minutiae topics based on their actual use within that time frame. As an example and not by way of limitation, if four months passed since both "2014 Miss Universe" and "Miss Universe 2014" were both present in the indexed database, but more users selected "Miss Universe 2014" in autosuggestion or typeahead contexts, social-networking system 160 may choose to delete "2014 Miss Universe" since it is less popular with users.

Figure 5A:
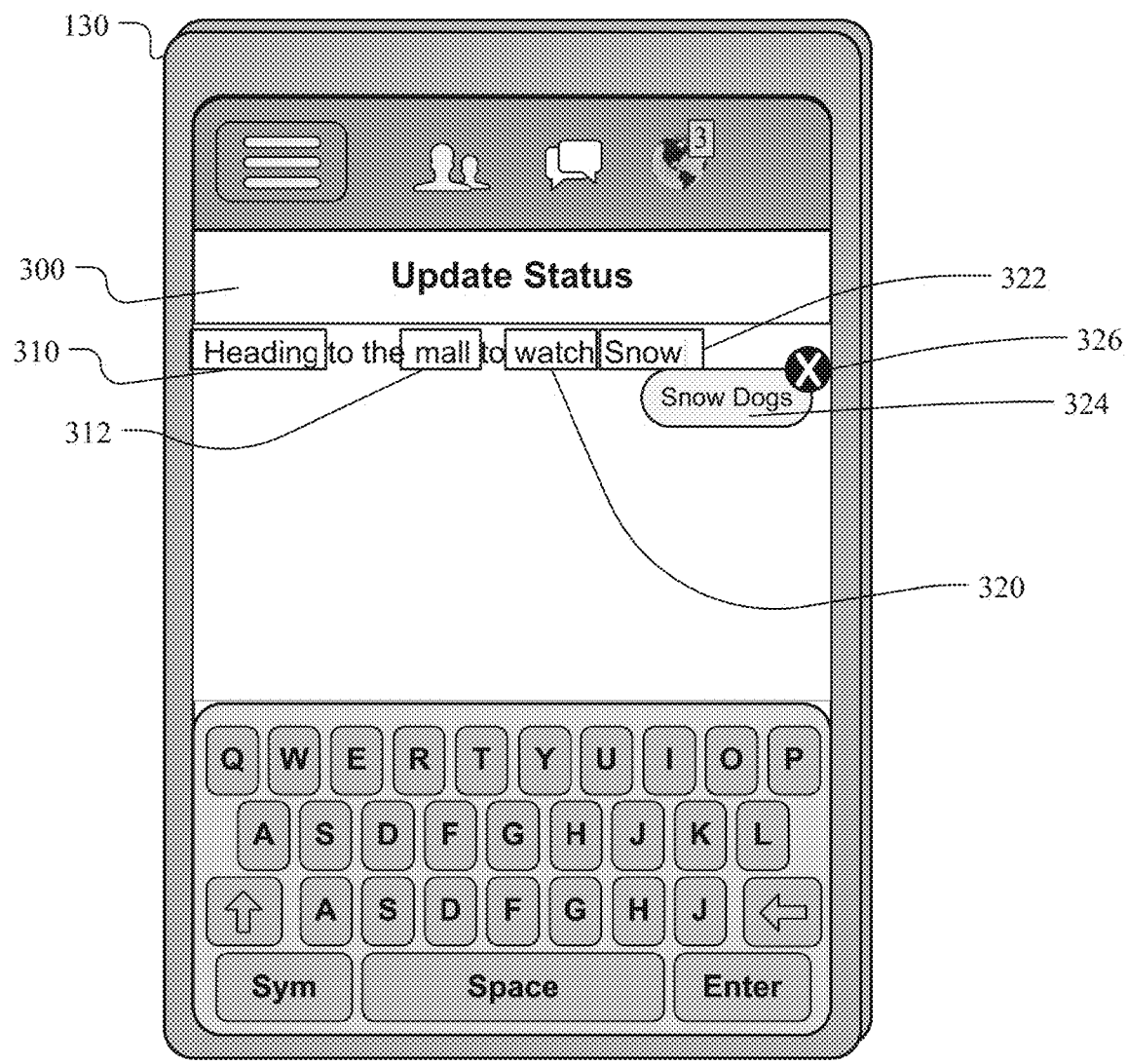
FIG. 5A-5C illustrates an example embodiment for adding a user-defined minutiae to the index which can be used for future suggestions to users.
Figure 5B:
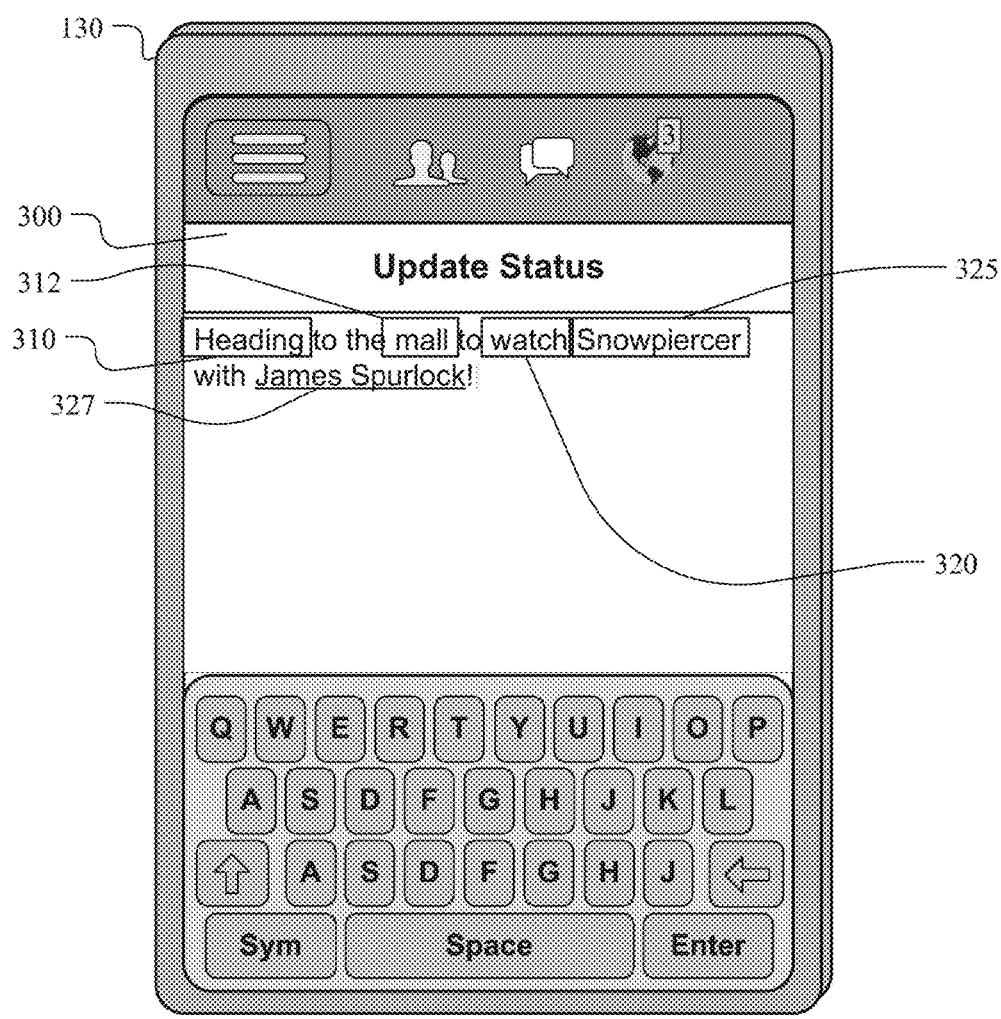
Figure 5C:
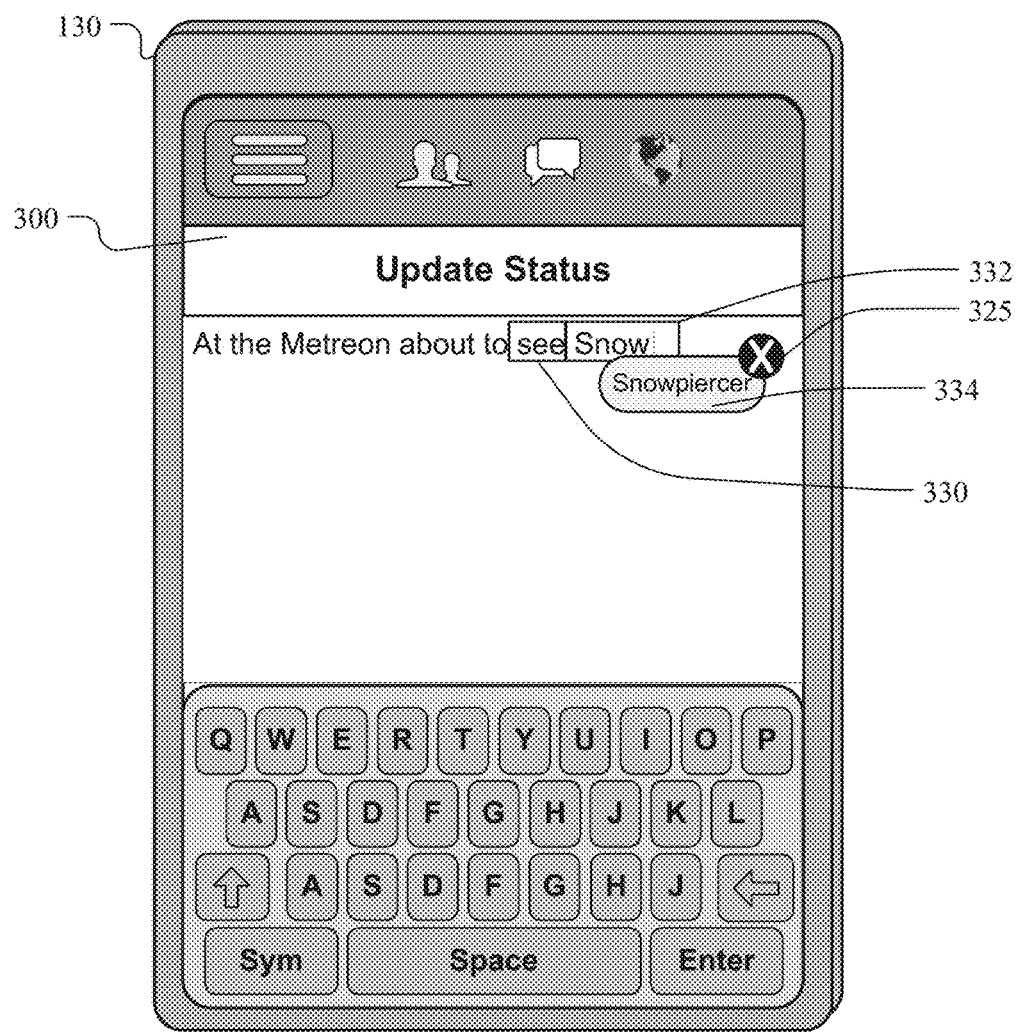

FIGS. 5A-5C illustrate an example embodiment of user-defined minutiae from a mobile client system 130 associated with a user of social-networking system 160. In FIG. 5A, a first user is using their mobile client system 130 to access a user interface 300 for the purposes of sharing a status update to social-networking system 160. Social-networking system 160 may monitor the text being input by the first user on interface 300, and determine that there are one or more actions 310, 320 indicated by the text. Social-networking system 160 may determine a phrase 312 to be associated with the first action 310. In the example of FIG. 5A, the first user is in the process of entering a phrase 322 to be associated with the second action 320. Social-networking system 160 may determine from the part of the phrase 322 currently input by the user, along with the associated action 320, and determine one or more minutiae phrases which may be suggested to the first user. In particular embodiments, social-networking system 160 may suggest the one or more minutiae phrases as a typeahead or as an autosuggestion. In the example of FIG. 5A, social-networking system 160 may display an autosuggestion 324 indicating a minutiae phrase determined by social-networking system 160 to be the most likely minutiae phrase being input by the first user. The first user may select the autosuggestion 324 to complete the text input, or may select another element 326 indicating that the first user does not wish to follow that autosuggestion. In particular embodiments, social-networking system 160 may display more than one autosuggestion or typeahead suggestion at a time. In particular embodiments, the first user may also interact with an element to indicate that the first suggestion presented on interface 300 is incorrect, and social-networking system 160 may present the autosuggestion determined to be the second-most likely.

In the example of FIG. 5B, the user may have selected element 326 to delete autosuggestion 324 from interface 300, and may input a complete phrase 325. In particular embodiments, social-networking system 160 may determine an end of complete phrase 325 based on subsequent text input by the user. In the example of FIG. 5B, the user typing in the status update has tagged another user 327 in the second line of the status update. Social-networking system 160 may determine that a complete phrase to be associated with action 320 does not extend to the tagged user 327. Social-networking system 160 may determine one or more topics and one or more categories to be associated with complete phrase 325, and store complete phrase 325 as an instance of the phrase. In particular embodiments, if the instances of complete phrase 325 have an aggregate count exceeding a threshold count, social-networking system 160 may add complete phrase 325 to an indexed database of minutiae phrases.

In the example of FIG. 5C, another user of social-networking system 160 may use their mobile client system 130 to access an interface 300 of social-networking system 160 to share a status update to social-networking system 160. This user may input text associated with a particular action 330, as well as at least part of a phrase 332 to be associated with action 330. Social-networking system 160 may present an autosuggestion or typeahead suggestion to the user of FIG. 5C, which may be an autosuggestion 334 of a minutiae phrase comprising the same phrase 325 that was input by the user of FIG. 5B. In particular embodiments, the user of FIG. 5B may be the same user in FIG. 5C. In particular embodiments, social-networking system 160 may determine an affinity for the user inputting phrase 332 with one or more users associated with the minutiae phrase of autosuggestion 334. As an example and not by way of limitation, user Anna may be in the process of typing in a status update stating "watching Snow . . . " Social-networking system 160 may determine a number of minutiae phrases which may be suggested to Anna at this point, for example minutiae phrases for the movies Snowpiercer, Snow White, or Snow Dogs. Social-networking system 160 may select one of the minutiae phrases based on minutiae selected by or defined by other users of social-networking system 160 who have an affinity with Anna. In this example, user Bob, a friend of Anna on social-networking system 160, may have previously shared a status update with the user-defined minutiae phrase "Snowpiercer," which by the time Anna is typing her status update has been added to the indexed database. Social-networking system 160 may determine that the minutiae phrase "Snowpiercer" should be suggested to Anna rather than other valid minutiae phrases based on Bob's actions. As another example, Anna may have two friends Celia and Doug who have both recently shared status updates comprising the minutiae phrase for "Snow Dogs." In this example, both Celia and Doug may have selected the autosuggestion for the minutiae phrase "Snow Dogs" while typing in their status update. Social-networking system 160 may determine that based on the affinity of Anna with respect to Celia and Doug, who are both now associated with the minutiae phrase "Snow Dogs," the autosuggestion to Anna should be for "Snow Dogs."

In particular embodiments, social-networking system 160 may use various methods to improve the accuracy of topics and categories tagged for a particular phrase shared by a user. In particular embodiments, social-networking system 160 may break down a phrase into multiple subparts and independently determine one or more topics and categories for each subpart of the phrase. Social-networking system 160 may then compare the topics and categories for each subpart and determine that there are no inconsistencies between the subparts. As an example and not by way of limitation, a user may share a status update stating "Visiting St. Louis for the weekend, going to eat toasted ravioli, Provel pizza, and frozen custard, and go to a Cardinals game." Social-networking system 160 may determine that "St. Louis" is associated with "visiting", "Cardinals game" is associated with "go to," and "toasted ravioli, Provel pizza, and frozen custard" is associated with "eat." For this latter phrase, social-networking system 160 may break down the phrase into discrete subparts for "toasted ravioli," "Provel pizza," and "frozen custard," each of which may be associated with the action "eat." Social-networking system 160 may then compare the topics and categories for the following phrases: "St. Louis," "toasted ravioli," "Provel pizza," "frozen custard," and "Cardinals game" to see if there are any inconsistencies. In this example, as all of these topics may be determined to be associated with the city of St. Louis, Mo., social-networking system 160 may determine that there are no inconsistencies, and validate topic and category tagging for phrases that are not in the indexed database of social-networking system 160.

In particular embodiments, social-networking system 160 may create a probability distribution for a particular word or words input by a user, wherein the probability distribution for a particular word represents the probability that the particular word will be associated with a particular topic. As an example and not by way of limitation, a user may share a status update that only states "Ratatouille!" From this status update, social-networking system 160 may not have enough context to determine what topic is being referenced by this phrase, e.g. the food ratatouille or the movie Ratatouille. Social-networking system 160 may instead use a probability distribution for the word Ratatouille based on all previous uses of the word on social-networking system 160. In this example, social-networking system 160 may determine that 95% of the uses of the word "Ratatouille" in social-networking system 160 referred to the movie, while just 5% of uses referred to the food. In this example, social-networking system 160 may further distinguish based on the exclamation point at the end of the status update. Social-networking system 160 may, for example, determine for all uses of "Ratatouille!" including the exclamation point on social-networking system 160, 99% of the time, the topic or category referenced was for the movie. Therefore, for the user's current status update, social-networking system 160 may determine that the movie is being referenced, not the food. In particular embodiments, if the user is still in the middle of typing "Ratatouille," social-networking system 160 may suggest the movie as a typeahead or as an autosuggestion. The typeahead or autosuggestion may include an indication that the suggestion is for the movie, and not the food.

Figure 6:
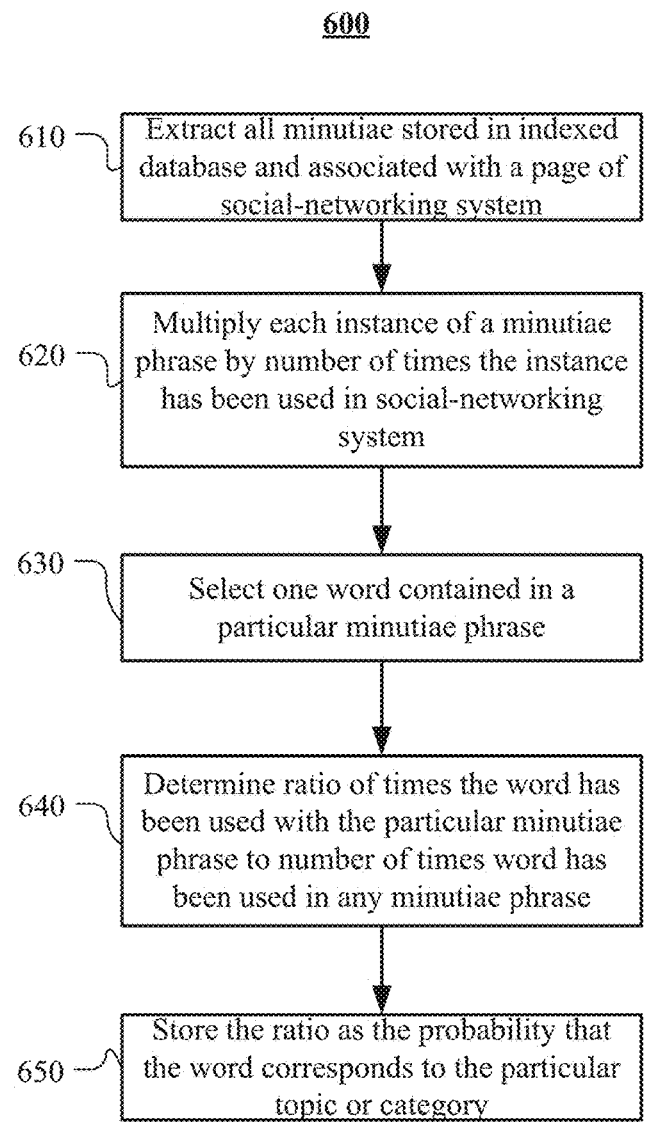
FIG. 6 illustrates an example method for determining topics to be associated with a particular word.

FIG. 6 illustrates an example method 600 for determining probability distributions of categories for words contained within one or more minutiae of an indexed database. At step 610, social-networking system 160 may extract all minutiae stored within the indexed database which are associated with at least one page of social-networking system 160. In particular embodiments, step 610 may additionally include user-defined minutiae added to the index which do not have an associated page on social-networking system 160. At step 620, social-networking system 160 may multiply each instance of a particular minutiae phrase by the number of times it has been used in social-networking system 160. As an example and not by way of limitation, if users of social-networking system 160 have used the minutiae phrase for "California Golden Bears" 10,000 times, and the minutiae phrase for "California Girls" 90,000 times, each of those minutiae phrases will be multiplied by their respective number of uses. At step 630, social-networking system 160 may select one or more words used in minutiae phrases. As an example and not by way of limitation, continuing the example above, social-networking system 160 may select the word "California." At step 640, social-networking system 160 may determine the ratio of times that the selected word from step 630 is associated with a particular topic or category. Continuing the example above, social-networking system 160 may determine that the word "California" is associated with the topic "California Golden Bears" or the category "football teams" 10% of the time, while it is associated with the topic "California Girls" or the category "songs by Katy Perry" 90% of the time. At step 650, social-networking system 160 may store the calculated ratios for each word as a probability distribution for the particular word.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, the probability distribution determined by the example method of FIG. 6 may be refined to a probability distribution within a particular category. As an example and not by way of limitation, social-networking system 160 may calculate the probability distribution for the word "Snow" when it is used in the context of a movie or TV show, e.g. "Snow White" versus "Snow Dogs." If the refined probability distribution has been calculated for a word with respect to a particular category, social-networking system 160 may use the refined probability distribution if social-networking system 160 determines that the word is being used within that category. As an example and not by way of limitation, if a user starts typing in "watching Snow . . . ," social-networking system 160 may determine that the word "Snow . . . " is being used in the context of a TV show or movie, and use the refined probability distribution to make a typeahead suggestion or autosuggestion to the user. As another example, if the user simply starts a status update "Snow . . . ," social-networking system 160 may determine that the context of the word is not known, and use the general probability distribution for the word "Snow." In particular embodiments, social-networking system 160 may use a trained regression model to determine whether the refined probability distribution should be used to select a topic, or whether the topics tagged to certain words and phrases should be used.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170

(e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
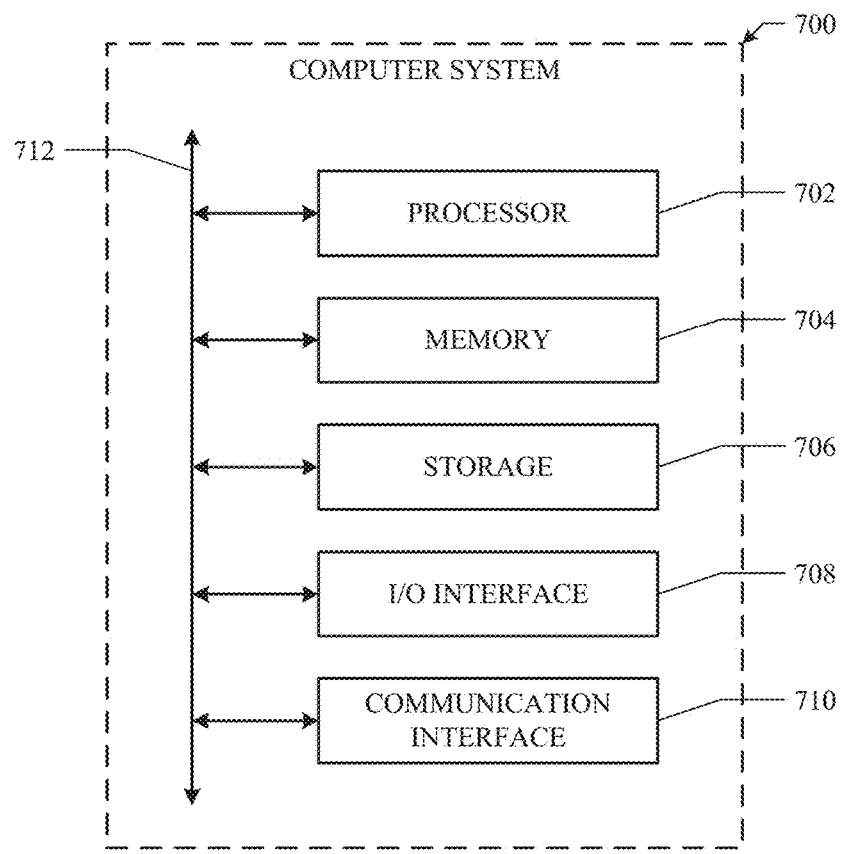
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface

708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving text input by a user;
   by the computing device, identifying an action by the user indicated by the text;
   by the computing device, identifying at least a part of a phrase in the text associated with the action;
   by the computing device, determining whether the action and the at least a part of a phrase match one or more phrases stored in an indexed database by comparing the associated action and the at least a part of a phrase with phrases stored in the indexed database, wherein the indexed database comprises actions and phrases associated with the respective actions;
   by the computing device, upon determining that the action and the at least part of a phrase do not match one or more phrases of the indexed database:
     determining a complete phrase input by the user;
     determining one or more topics to be associated with the complete phrase based at least in part on a probability distribution that represents a probability that a topic is associated with one or more words comprising the complete phrase and a context indicated by the associated action;
     storing the complete phrase as an instance of the complete phrase on the computing device;
     determining whether the computing device has received at least a threshold number of instances of the complete phrase; and
     adding the complete phrase to the indexed database.

2. The method of claim 1, further comprising:
upon determining that the action and the at least a part of a phrase match one or more of the phrases, suggesting one or more of the phrases to the user.

3. The method of claim 2, wherein the one or more phrases are suggested as a typeahead or autosuggestion.

4. The method of claim 2, wherein suggesting the one or more phrases to the user is based at least in part on social-networking information associated with the user.

5. The method of claim 4, wherein the social-networking information comprises determining a social affinity between the user and one or more users of the social-networking system associated with the one or more phrases.

6. The method of claim 1, wherein the one or more phrases are further associated with:
   at least one category; or
   a page of a social-networking system.

7. The method of claim 6, wherein determining whether the action and the at least a part of a phrase match one or more phrases comprises determining whether one or more categories associated with the at least part of a phrase corresponds to the at least one category associated with the one or more phrases.

8. The method of claim 7, wherein determining one or more categories associated with the at least part of a phrase is based at least in part on the action by the user indicated by the text.

9. The method of claim 1, further comprising determining one or more categories for the complete phrase.

10. The method of claim 1, further comprising excluding from the indexed database one or more complete phrases based on a language filter.

11. The method of claim 1, further comprising:
    determining that two or more complete phrases in the indexed database are substantially identical based at least in part on the topics associated with each complete phrase; and
    removing at least one of the two or more complete phrases from the indexed database.

12. The method of claim 11, wherein determining one or more complete phrases to be kept in the indexed database is based at least in part on:
    a time when each complete phrase was added to the indexed database; or
    a number of instances for each complete phrase received by the computing device.

13. The method of claim 1, wherein the user is associated with a social-networking system, and the number of instances of the complete phrase received by the computing device comprises instances of the complete phrase received from all users of the social-networking system.

14. The method of claim 1, wherein determining one or more topics to be associated with a complete phrase comprises:
    dividing the complete phrase into one or more subparts; and
    determining one or more topics for each of the one or more subparts of the complete phrase.

15. The method of claim 1, wherein the probability distribution is determined based on topics associated with one or more pages of a social-networking system.

16. The method of claim 1, wherein determining the probability distribution comprises:
    determining all uses of all phrases stored in the indexed database, each phrase being associated with at least one category; and
    calculating for the one or more words a probability that a particular category is associated with the one or more words, the probability comprising a number of times the one or more words were associated with the particular category divided by a number of times the one or more words were associated with any category in the indexed database.

17. The method of claim 1, wherein determining one or more topics to be associated with the complete phrase is adjusted based on a machine-learning method.

18. One or more computer-readable non-transitory storage media embodying software that is operable when executed to:
    receive text input by a user;
    identify an action by the user indicated by the text;
    identify at least a part of a phrase in the text associated with the action;
    determine whether the action and the at least a part of a phrase matches one or more phrases stored in an indexed database by comparing the associated action and the at least a part of a phrase with phrases stored in the indexed database, wherein the indexed database comprises actions and phrases associated with the respective actions;
    upon determining that the action and the at least part of a phrase do not match one or more phrases of the indexed database:
        determine a complete phrase input by the user;
        determine one or more topics to be associated with the complete phrase based at least in part on a probability distribution that represents a probability that a topic is associated with one or more words comprising the complete phrase and a context indicated by the associated action;
        store the complete phrase as an instance of the complete phrase on the computing device;
        determine whether the computing device has received at least a threshold number of instances of the complete phrase; and
        add the complete phrase to the indexed database.

19. A system comprising: one or more processors; and a memory coupled to the processors comprising instructions executable by the processors, the processors being operable when executing the instructions to:
    receive text input by a user;
    identify an action by the user indicated by the text;
    identify at least a part of a phrase in the text associated with the action;
    determine whether the action and the at least a part of a phrase matches one or more phrases stored in an indexed database by comparing the associated action and the at least a part of a phrase with phrases stored in the indexed database, wherein the indexed database comprises actions and phrases associated with the respective actions;
    upon determining that the action and the at least part of a phrase do not match one or more phrases of the indexed database:
        determine a complete phrase input by the user;
        determine one or more topics to be associated with the complete phrase based at least in part on a probability distribution that represents a probability that a topic is associated with one or more words comprising the complete phrase and a context indicated by the associated action;
        store the complete phrase as an instance of the complete phrase on the computing device;

determine whether the computing device has received at least a threshold number of instances of the complete phrase; and add the complete phrase to the indexed database.

* * * * *